United States Patent
Alshawi et al.

[11] Patent Number: 5,956,668
[45] Date of Patent: Sep. 21, 1999

[54] METHOD AND APPARATUS FOR SPEECH TRANSLATION WITH UNRECOGNIZED SEGMENTS

[75] Inventors: Hiyan Alshawi, Madison; David Arthur Berkley, Summit, both of N.J.

[73] Assignee: AT&T Corp., New York, N.Y.

[21] Appl. No.: 08/897,054

[22] Filed: Jul. 18, 1997

[51] Int. Cl.$^6$ ............................ G06F 17/28; G10L 3/00
[52] U.S. Cl. ........................................... 704/2; 704/277
[58] Field of Search ........................... 704/1, 2, 9, 277, 704/251, 253

[56] References Cited

U.S. PATENT DOCUMENTS

| | | | |
|---|---|---|---|
| 4,984,177 | 1/1991 | Rondel et al. | 704/277 |
| 5,724,526 | 3/1998 | Kunita | 704/277 |
| 5,765,131 | 6/1998 | Stentiford | 704/277 |
| 5,848,389 | 12/1998 | Asano et al. | 704/277 |

OTHER PUBLICATIONS

Lacouture et al., "Detection of Ambiguous of Signal corresponding to OOV words or misrecognizes portions of input" ICSLP 96, Oct. 3–6, 1996, (four pages).

Gallwitz et al., "A Category Based Approach For Recognition of Out–of–Vocabulary Words" ICSLP 96, Oct. 3–6, 1996, (four pages).

Semantic Processing Of Out–Of–Vocabulary Words In a Spoken Dialogue System, by Boros, Aretoulaki, Gallwitz, Noth and Niemann, reprinted from *EuroSpeech–97: European Conf. on Speech Communication and Technology*, Rhodes, Greece, Sep., 1997 (four pages).

"OOV Utterance Detection based on the recognizer Response Function" by Bernstein and Evans, reprinted from *EuroSpeech–97: European Conf. on Speech Communication and Technology*, Rhodes, Greece, Sep., 1997 (three pages).

"Acoustic Indexing For Multimedia Retrieval And Browsing" by Young, Brown, Foote, Jones and Jones, *Proc. Int. Conf. on Acoustics, Speech, and Signal Processing*, Munich, Germany, Apr., 1997 (four pages).

"Word Spotting From Continuous Speech Utterances" by Richard C. Rose, published in *Automatic Speech and Speaker Recognition: Advanced Topics*, edited by Chin–Hui Lee, Frank K. Soong, and Kuldip K. Paliwal, Kluwer Academic Publishers, Boston, 1996, pp. 303–329.

"Two–Pass Strategy For Continuous Speech Recognition With Detection And Transcription Of Unknown Words" by Matsunaga and Sakamoto, *Proc. Int. Conf. on Acoustics, Speech, and Signal Processing*, Atlanta, Georgia, May, 1996 (four pages).

"Modelling Unknown Words In Spontaneous Speech" by Kemp and Jusek, *Proc. Int. Conf. on Acoustics, Speech, and Signal Processing*, Atlanta, Georgia, May, 1996 (four pages).

"An Enquiring System Of Unknown Words In TV News By Spontaneous Repetition" by Ariki and Tagashira, *Proc. Int. Conf. on Spoken Language Processing*, Philadelphia, Pennsylvania, Oct., 1996 (four pages).

Improved Modelling Of OOV Words In Spontaneous Speech, by Fetter, Kaltenmeier, Kuhn and Regel–Brietzmann, *Proc. Int. Conf. on Acoustics, Speech, and Signal Processing*, Atlanta, Georgia, May, 1996 (four pages).

*Primary Examiner*—Forester W. Isen
*Assistant Examiner*—Patrick N. Edouard

[57] ABSTRACT

A method for the treatment of unrecognized words and phrases in spoken language translation systems is applicable to open-ended word or phrase categories, such as proper names, and involves the demarcation of one or more unrecognized segments from the input speech signal and splicing these segments into the appropriate position of the synthesized speech signal for the translation.

6 Claims, 1 Drawing Sheet

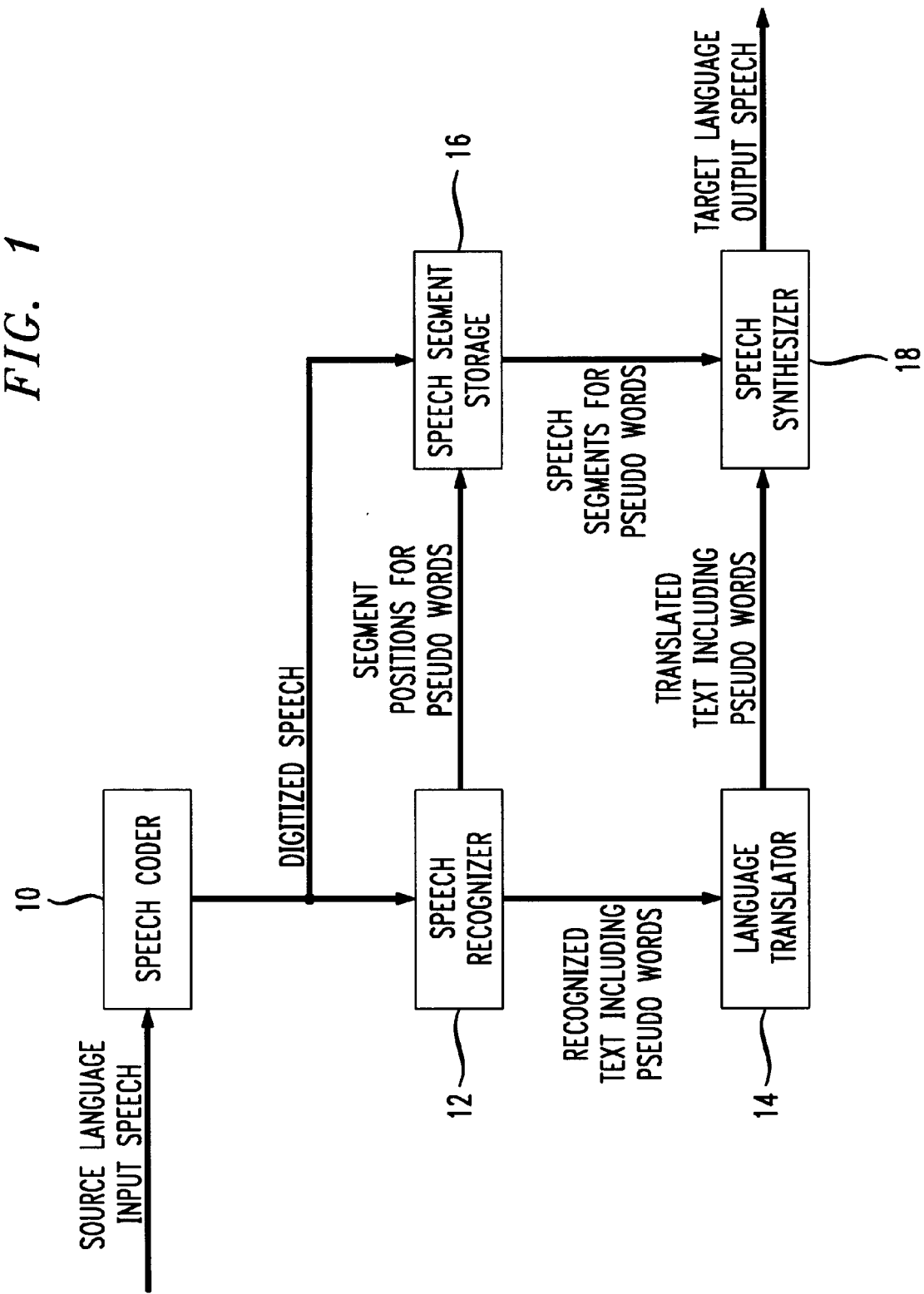

METHOD AND APPARATUS FOR SPEECH TRANSLATION WITH UNRECOGNIZED SEGMENTS

FIELD OF THE INVENTION

This invention relates generally to speech translation, and more particularly to translating an utterance having segments that are not properly recognizable.

BACKGROUND OF THE INVENTION

Speech translation systems are often faced with unrecognized words or phrases in an input speech signal representing speech. These unrecognized words or phrases are often proper names of people, cities, companies, etc. Existing systems typically take one of the following actions in response to this problem:

(i) ignoring (or deleting) the unknown items, resulting in an incomplete translation of the original speech having, for example, a missing place name.

(ii) finding the nearest match of the unknown segment of speech to items in the known vocabulary of the system. Since the chosen item may be unrelated in meaning to the unknown segment, this leads to incorrect or misleading translations.

(iii) asking the user to rephrase the entire original phrase, resulting in confusion for the user who may not be sure why the system is not able to cope with the input.

SUMMARY OF THE INVENTION

A speech translation system according to the invention includes a speech coder, which receives source language input speech and produces digitized speech. A speech recognizer is coupled to the speech coder. The speech recognizer produces based on the digitized speech a recognized text word sequence including one or more pseudo words, and segment position information for the one or more pseudo words. A language translation component is coupled to the speech recognizer. The language translation component produces a translated text word sequence that includes the one or more pseudo words based on the recognized text word sequence. A speech segment storage component is coupled to the speech recognizer. The speech segment storage component stores the digitized speech and the segment position information so that it can produce segments of the digitized speech for which the one or more pseudo words were created based on the segment position information. A speech synthesizer is coupled to the language translation component and the speech segment storage component. The speech synthesizer produces, based on the translated text word sequence, target language output speech including the segments of the digitized speech in place of the one or more pseudo words.

Other features and advantages of the invention will become apparent from the following detailed description, taken in conjunction with the accompanying drawing, which illustrates, by way of example, the features of the invention.

BRIEF DESCRIPTION OF THE DRAWING

FIG. 1 illustrates a speech translation system in accordance with the principles of the invention.

DETAILED DESCRIPTION

For a better understanding of the invention, together with other and further objects, advantages, and capabilities thereof, reference is made to the following disclosure and figure of the drawing. For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Speech translation systems are often faced with unrecognized words or phrases in an input speech signal. These unrecognized words or phrases are often proper names of people, cities, companies, etc. Existing speech translation systems handle such items by simply ignoring them, leading to incomplete translations, or by mapping them onto acoustically similar items in the known vocabulary, leading to incorrect translations.

We have discovered a method for the treatment of unrecognized words and phrases in spoken language translation systems. The method is applicable to open-ended word or phrase categories, such as proper names, and involves the demarcation of one or more unrecognized segments from the input speech signal and splicing these segments into the appropriate position of the synthesized speech signal for the translation. A speech translation system in accordance with the principles of the invention includes a speech recognition component, a language translation component, and a speech synthesis component and is capable of translating speech having unrecognizable segments.

Segments of an input audio speech signal which are likely to correspond to words, or sequences of words, that are not included in the vocabulary of the speech recognition component are identified. Identifying segments of the input speech signal which are hypothesized to be outside the vocabulary of the speech recognizer can be carried out using methods well known in the art of speech recognition. Such methods have been developed and implemented in systems performing word spotting and out-of-vocabulary segment rejection. Typically, the methods make use of statistical hypothesis testing to obtain a measure of confidence of the likelihood that a segment of speech does not correspond to items in the known vocabulary. For example, an overview of such methods is provided in the article "Word Spotting from Continuous Speech Utterances" by Richard C. Rose (published in *Automatic Speech and Speaker Recognition: Advanced Topics*, edited by Chin-Hui Lee, Frank K. Soong, and Kuldip K. Paliwal, Kluwer Academic Publishers, Boston, 1996.)

"Pseudo-word" items are constructed for these segments of the speech signal that are hypothesized to be outside the vocabulary of the speech recognition component, and the association between the pseudo-words and corresponding segment boundaries in the speech signal is preserved.

The pseudo-word items are included in the data structures passed to the language translation component. These data structures may take the form of a text sequence of words, a word lattice, or an N-best list.

Language translation of the input audio signal to a text word sequence is performed, during which the identified pseudo-words are treated as words that translate into themselves, with properties similar to proper names and/or other grammatical classes. This results in a transduced text sequence of words that includes the pseudo words. A technique for translating an audio speech signal into a text sequence of output words is described in detail in copending U.S. application Ser. No. 08/665,182, entitled "METHOD AND APPARATUS FOR LANGUAGE TRANSLATION", filed Jun. 14, 1996, which is incorporated by reference as if fully set forth herein.

An output audio speech signal is synthesized from this output word sequence, during which the pseudo-words in the output word sequence are replaced with the original input audio speech signal for the unrecognized segments using the information describing the association between the pseudo-words and the unrecognized segment boundaries that was preserved. A variant of the method is to associate the pseudo-words for unrecognized segments with phonetic coding strings, and to synthesize the output speech from this phonetic coding in the final step.

A speech translation system in accordance with the principles of the invention is illustrated schematically in FIG. 1. The speech translation system shown in FIG. 1 includes a speech coder 10. The speech coder 10 receives source language input audio speech and produces a digitized speech signal (i.e., digitized speech) based thereon. A speech recognizer 12 with unknown word detection capability is coupled to the speech coder 10. The speech recognizer 12 produces a recognized text output word sequence in response to the digitized speech signal. The recognized text output word sequence includes pseudo words. A language translator component 14 is coupled to the speech recognizer 12. The language translator 14 produces a translated text output word sequence including the pseudo words in response to the recognized text output word sequence that includes the pseudo words.

The speech recognizer 12 produces, based on the digitized speech signal, segment positions for the pseudo words. A speech segment storage component 16 is coupled to the speech recognizer 12. The speech segment storage component 16 stores the digitized speech signal and the segment positions for the pseudo words and can produce, from the digitized speech signal, the speech segments for which the pseudo words were created using the segment position information.

A speech synthesizer component 18 is coupled to the language translator 14 and to the speech segment storage component 16. The speech synthesizer 18 receives the translated text output word sequence from the language translation component 14. The translated text output word sequence includes the pseudo words therein. The synthesizer 18 synthesizes a digitized audio signal from the translated text. Using the information describing the speech and pseudo word segmentation obtained from the speech segment storage component 16, the speech synthesizer 18 removes the pseudo words from the digitized audio signal, and replaces them with the digitized speech signal of the untranslatable segment for which the pseudo words were created.

Referring to FIG. 1, the input speech audio signal in the source language is digitized by the speech coder 10 in a form suitable for a speech recognizer. This digital format should also be suitable for audio playback or should be convertible into the specific format used as the output audio format of the speech synthesizer 18. The digitized speech is sent both to a speech recognizer 12 and to a speech segment storage component 16.

The speech recognizer 12 performs known processes for identifying segments that are likely to be out-of-vocabulary items. The output of the speech recognition component 12 is a sequence of words and unknown word segments representing the most likely decoding of the input speech according to the one or more speech recognition models being applied by the speech recognition component 12. More generally, the output is in the form of a network, each path through the network being such a sequence of words and unknown segments.

In this output sequence, or similarly in the network, the endpoint positions (i.e., starting and stopping times in the original speech signal) of each word or unknown segment are retained as follows. A unique label (e.g., USeg1, USeg2, ...) that is referred to as a "pseudo word", is associated with each unknown segment in the output of the speech recognizer 12. Each unknown segment, together with its endpoint positions, is sent to the speech segment storage component 16, which has already received the entire digitized speech signal from the speech coder 10.

The speech segment storage component 16 either retains the entire digitized speech and a table associating endpoint positions for each pseudo word or builds a table associating each pseudo-word directly with a copy of the relevant segment of speech identified by the endpoint positions. In either case, the storage component 16 can be used to retrieve the speech segment associated with any given pseudo word label.

Each unknown segment item in the sequence (or network) produced by the speech recognizer 12 is replaced by the pseudo word for the segment. The resulting modified sequence (or network) is passed to the language translation component 14.

A dictionary within the language translation component 14 includes one or more special entries that match any pseudo word. These entries specify the grammatical information to be used for the treatment of pseudo words in the language translation process. In the simplest embodiment, there is a single special entry specifying that a pseudo word has the grammatical category of a proper name that translates into itself.

The language translator 14 then identifies the most likely translation of the sequence or network into a sequence of words for the target (i.e., output) language. Techniques for doing this are well known in the art and are disclosed in the copending U.S. application Ser. No. 08/665,182, previously incorporated by reference herein.

Special entries matching pseudo words are included in the dictionary of the language translator 14. The word sequence output by the speech recognizer 12 includes the pseudo words therein. The output word sequence from the language translator 14 is passed to the speech synthesis component 18.

The speech synthesis component 18 makes a synthesized audio signal from the translated text. The speech synthesizer 18 is programmed so that whenever a pseudo word is encountered in the text output word sequence from the language translator 14, the synthesized audio signal includes the speech segment (i.e., the segment of digitized speech) for which the pseudo word was created. In one embodiment, the speech synthesizer 18 includes a table of stored speech for common words or phrases, and this table is augmented by copying the entries from the speech segment storage component 16 before synthesis starts. In another embodiment, the control flow of the speech synthesizer 18 is modified so that it executes a request to fetch the speech segment for which a pseudo word was created from the storage component 16 each time it encounters a pseudo word during the synthesis process. In either embodiment, for each pseudo word encountered in the translated text word sequence, the speech segment stored therefor is spliced by the speech synthesis component 18 into the target language output audio signal, replacing the pseudo word, in the order specified by the sequence of pseudo words and target language words produced by the language translation component 14.

The language translation component 14 often changes the order of words (and pseudo words) when converting the input source language into the output target language, so the positions and ordering of unknown segments in the audio speech signal representing the translated speech finally produced by the synthesizer 18 may (correctly) be different from their order in the original input speech.

The present invention can be used in other speech processing applications that require speech recognition together with the condition that unrecognizable segments can be preserved in speech form for play-back to a human. An example is a browser for text transcripts of spoken audio files from broadcasts. In such a browsing system, an unrecognizable segment appears as an icon, or special word, in the text. While reading the transcript, a user can play back the segment by selecting it with a pointing device.

The foregoing merely illustrates the principles of the invention. It will thus be appreciated that those skilled in the art will be able to devise various arrangements which, although not explicitly described or shown herein, embody the principles of the invention and are thus within its scope and spirit.

What is claimed is:

1. A speech translation system, comprising:

a speech recognizer, which produces based on digitized speech (i) a recognized text word sequence including one or more labels identifying segments of the digitized speech, and (ii) segment position information for said one or more labels identifying said segments of said digitized speech;

a language translation component coupled to the speech recognizer, the language translation component produces a translated text word sequence that includes said one or more labels identifying said segments of said digitized speech based on the recognized text word sequence;

a speech segment storage component coupled to the speech recognizer, the speech segment storage component stores said digitized speech and said segment position information and produces said segments of said digitized speech based on said segment position information; and a speech synthesizer coupled to the language translation component and the speech segment storage component, the speech synthesizer produces, based on the translated text word sequence, target language output speech including said segments of said digitized speech in place of said one or more labels.

2. A system as defined in claim 1, further comprising:

a speech coder coupled to the speech recognizer and the speech segment storage component, the speech coder receives source language input speech and produces the digitized speech.

3. A method of translating speech, comprising the following steps:

(A) making from digitized speech a recognized text word sequence including one or more labels identifying segments of said digitized speech and segment position information;

(B) translating the recognized text word sequence into a translated text word sequence that includes said one or more labels identifying said segments of said digitized speech; and (C) synthesizing target language output speech from the translated text word sequence wherein said segments of said digitized speech are substituted in place of said one or more labels based on said segment position information.

4. A method as defined in claim 3, wherein step (A) comprises the steps of:

receiving source language input speech, making said digitized speech from the source language input speech, and recognizing said digitized speech to make the recognized text word sequence including said one or more labels identifying said segments of said digitized speech.

5. A method as defined in claim 3, further comprising the step of:

storing segment position information for said one or more labels identifying said segments of said digitized speech.

6. A speech translation system, comprising:

means for making from digitized speech a recognized text word sequence including one or more labels identifying segments of said digitized speech and segment position information for said one or more labels;

means for translating the recognized text word sequence into a translated text word sequence that includes said one or more labels identifying said segments of said digitized speech; and means for synthesizing target language output speech from the translated text word sequence wherein said segments of said digitized speech are substituted in place of said one or more labels based on said segment position information.

* * * * *